(12) United States Patent
Miyakawa

(10) Patent No.: US 7,172,349 B2
(45) Date of Patent: Feb. 6, 2007

(54) LIGHT AMOUNT CONTROL DEVICE AND OPTICAL APPARATUS WITH GUARD PORTION TO PROTECT ND FILTER FROM LEVER MEMBER

(75) Inventor: Masae Miyakawa, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 11/042,310

(22) Filed: Jan. 24, 2005

(65) Prior Publication Data
US 2005/0163501 A1 Jul. 28, 2005

(30) Foreign Application Priority Data
Jan. 28, 2004 (JP) .............................. 2004-020550

(51) Int. Cl.
G03B 9/08 (2006.01)
G03B 9/36 (2006.01)
G03B 9/40 (2006.01)
G03B 9/02 (2006.01)

(52) U.S. Cl. ...................... 396/488; 396/450; 396/483; 396/505

(58) Field of Classification Search ................ 396/488, 396/483, 450, 505, 485, 241
See application file for complete search history.

(56) References Cited
U.S. PATENT DOCUMENTS
6,533,473 B1 * 3/2003 Edamitsu et al. ........... 396/450

2005/0123290 A1 * 6/2005 Hasegawa et al. .......... 396/484
2006/0039695 A1 * 2/2006 Naganuma .................. 396/485

FOREIGN PATENT DOCUMENTS
JP H07-028123 1/1995

* cited by examiner

Primary Examiner—W. B. Perkey
Assistant Examiner—Chia-how Michael Liu
(74) Attorney, Agent, or Firm—Cowan, Liebowitz & Latman, P.C.

(57) ABSTRACT

Provided is a light amount control device eliminating a deviation in image forming position over the entire area of the variable range of an aperture due to an ND filter and assuring smooth stopping operation. The light amount control device of the present invention includes: a first shading member and a second shading member which are adapted to move within a plane perpendicular to an optical axis to vary an area of a light passage opening; a lever member which is connected with the first shading member and the second shading member and which is rotatable; an actuator for driving the lever member; and an ND filter mounted to the first shading member. The ND filter is configured to cover an entirety of the light passage opening in an open state, and the second shading member has a guard portion which, with the light passage opening being in a closed state, is arranged between the lever member and the ND filter, preventing the ND filter from coming into contact with the lever member.

6 Claims, 11 Drawing Sheets

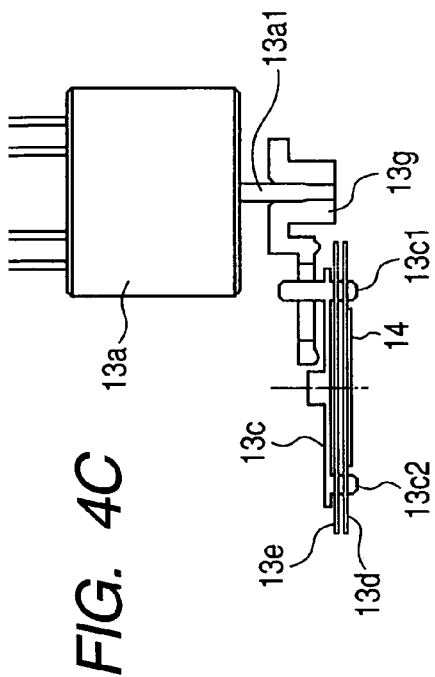
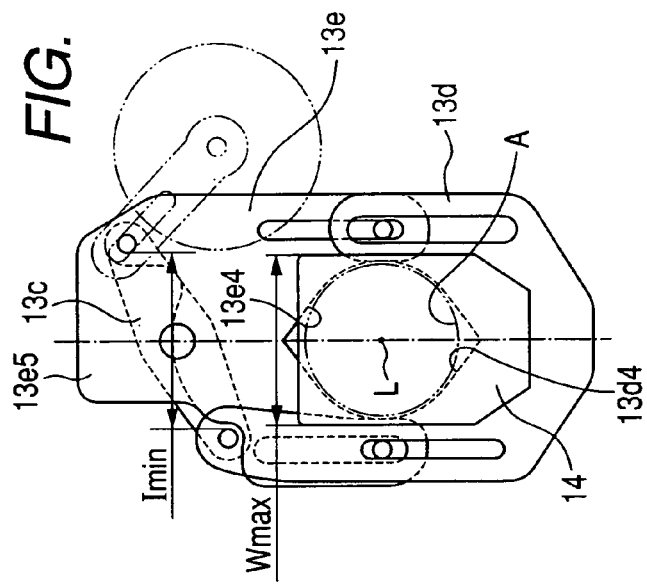
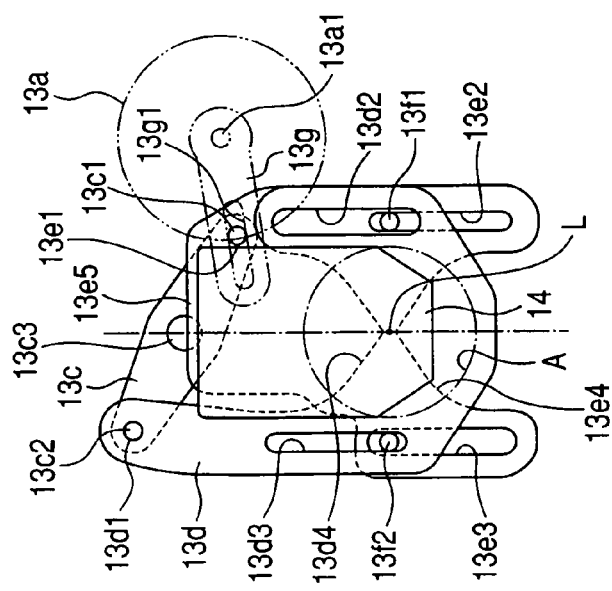

LIGHT AMOUNT CONTROL DEVICE AND OPTICAL APPARATUS WITH GUARD PORTION TO PROTECT ND FILTER FROM LEVER MEMBER

BACKGROUND OF THE INVENTION

1. Field of the Invention

The present invention relates to a light amount control device for use in an optical apparatus, such as an electronic still camera, a video camera, or an interchangeable lens apparatus.

2. Related Background Art

An example of a stop device (a light amount control device) mounted in a conventional video camera is shown in FIG. 8.

This stop device is of a two-blade type, in which two aperture blades 123a and 123b are driven by a single rotary electromagnetic actuator (motor) 123c through a seesaw-type drive lever 123d. Symbol 123e indicates a base plate (i.e., casing) of the stop device.

Apart from this, there exists a stop device constructed as shown in FIGS. 9 and 10. FIG. 9 shows the state in which the aperture is fully open, and FIG. 10 shows the state in which the aperture is completely closed. FIG. 11 shows the construction of an optical system including the stop device.

In these drawings, symbol 113a indicates an actuator for opening and closing the aperture. The proximal end portion of a first lever (drive member) 113g is press-fitted onto an output shaft 113a1 of the actuator 113a. Pin portions 113c1 and 113c2 are formed at both ends of a second lever 113c. The pin portion 113c2 of the second lever 113c is engaged with a hole 113d1 of a first aperture blade 113d. On both sides with respect to the width direction of the first aperture blade 113d, there are formed elongated holes 113d2 and 113d3 extending in the vertical direction, and guide pins 113f1 and 113f2 formed on a base member 118 (see FIG. 11) of the stop device are engaged with the elongated holes 113d2 and 113d3.

The pin portion 113c1 of the second lever 113c is engaged with a hole 113e1 of a second aperture blade 113e. Formed on both sides with respect to the width direction of the second aperture blade 113e are vertically extending elongated holes 113e2 and 113e3, which are engaged with the guide pins 113f1 and 113f2. Further, the pin portion 113c1 is engaged with an elongated hole 113g1 formed in the first lever 113g.

Further, for small-aperture correction, an ND filter 114 is attached to the first aperture blade 113d so as to cover an aperture of approximately F5.6 to F8.

As shown in FIG. 11, the stop device constructed as described above is used in an optical system having first through fourth lens units 101 through 104 arranged in order from the object side, and is arranged between the first and second lens units 101 and 102. Light transmitted through the aperture formed by the first and second aperture blades 113d and 113e effects image formation on a light receiving surface of an imaging device 106. Arranged between the fourth lens unit 104 and the imaging device 106 is an optical block 105 consisting of an infrared filter, a low-pass filter or the like.

In the above-described stop device, when the actuator 113a rotates, the second lever 113c rotates through the first lever 113g, with the result that the aperture blades 113d and 113e are driven vertically as seen in the drawing.

The conventional ND filter 114 used is one of fixed density or one of varying density. In the case of a fixed density filter, as the sensitivity of the imaging device increases, the density of the ND filter is increased to reduce the light transmission amount, the minimum aperture of the stop being increased if the brightness of the object is the same.

It should be noted, however, that, as shown in FIG. 11, when the density of the ND filter is thus increased, the difference in light amount between light "a" transmitted through the ND filter 114 and light "b" transmitted through the pass-through area of the aperture (the area with no ND filter 114) increases, resulting in a deterioration in resolution.

To overcome this problem, there has been proposed a stop device using an ND filter with a transmission characteristic in which, as shown in FIGS. 12 and 13, the light transmission amount (that is, density) varies at a substantially fixed rate.

However, whether the ND filter is of fixed density or variable density, immediately before the ND filter covers up an aperture of a desired F number, for example, of F5.6, a deviation in image forming position occurs between the light "a" transmitted through the ND filter 114 and the light "b" transmitted through the pass-through area due to the thickness and refractive index of the ND filter 114. Thus, in the intermediate stop area, in addition to the above-mentioned difference in light amount, a deviation in image forming position leads to a further deterioration in resolution.

Also in the case in which an ND filter of variable density is used, it is possible to mitigate the deterioration in resolution due to the above-mentioned difference in light amount; however, the pixel pitch of the imaging device is then as small as 3.2 to 3.8 µm, and in a lens unit in which the permissible circle-of-confusion diameter is small, such deviation in imaging position as mentioned above generates one-side unsharpness to an impermissible degree, resulting in a deterioration in image quality.

To obtain a satisfactory image formation performance even in the intermediate stop area, there has been proposed an ND filter which, as shown in FIG. 14, has, on the open side with respect to light attenuation portions 114a and 114a' having a transmittance lower than 75%, an area (non-attenuation portion) 114b having a transmittance of 75% or more and formed of the same material and in the same thickness as those of these light attenuation portions. Moreover, as shown in the drawing, from the optical viewpoint, the non-attenuation portion 114b is set so as to be shifted from the open state to a position where it covers up the aperture, thereby making it possible to eliminate deviation in image forming position over the entire area of the variable range of the aperture.

However, as shown in FIG. 15, on the closed side, the ND filter 114 and the second lever 113c overlap and come into contact with each other in a shaded portion 114c (in particular, when there is warpage or the like in the ND filter 114), and the contact portion may make it impossible to perform smooth stopping operation.

SUMMARY OF THE INVENTION

It is an object of the present invention to provide a light amount control device eliminating a deviation in image forming position over the entire area of the variable range of the aperture due to the ND filter and guaranteeing smooth stopping operation, and an optical apparatus equipped with such a light amount control device.

To achieve the above-mentioned object, a light amount control device according to the present invention includes: a first shading member and a second shading member which are adapted to move within a plane perpendicular to an optical axis to vary an area of a light passage opening; a lever member which is connected with the first shading member and the second shading member and which is rotatable; an actuator for driving the lever member; and an ND filter mounted to the first shading member. The ND filter is configured to cover an entirety of the light passage opening in an open state, and the second shading member has a guard portion which, with the light passage opening being in a closed state, is arranged between the lever member and the ND filter, preventing the ND filter from coming into contact with the lever member.

In the light amount control device as described above, it is preferable that the lever member have at both ends thereof a first connecting portion and a second connecting portion for connection with the first shading member and the second shading member, and that, in the closed state, the ND filter overlap an inner-side portion between the first connecting portion and the second connecting portion of the lever member in the optical axis direction, with the guard portion being therebetween.

Alternatively, it is preferable that, in the closed state, a forward end of the ND filter with respect to a closing direction reach a position further spaced apart from the optical axis in a direction perpendicular to the optical axis than a connecting portion where the lever member and the second shading member are connected with each other, and that the guard portion extend to a position further spaced apart from the optical axis in the direction perpendicular to the optical axis than the connecting portion.

Further, to attain the above-mentioned object, an optical apparatus according to the present invention includes the light amount control device as described above.

It is preferable that the optical apparatus described above further include an optical system for effecting image formation with light passed through the light passage opening.

Alternatively, it is preferable that the optical apparatus described above further include an optical system capable of showing an observer a virtual image by using light passed through the light passage opening.

BRIEF DESCRIPTION OF THE DRAWINGS

FIG. 4A is a diagram showing the construction of a stop device (in the open state) mounted in the zoom lens barrel;

FIG. 4B is a diagram showing the construction of the stop device (in the totally closed state);

FIG. 4C is a top view of the stop device;

DESCRIPTION OF THE PREFERRED EMBODIMENTS

An embodiment of the present invention will now be described with reference to the drawings.

EMBODIMENT

Figure 1:
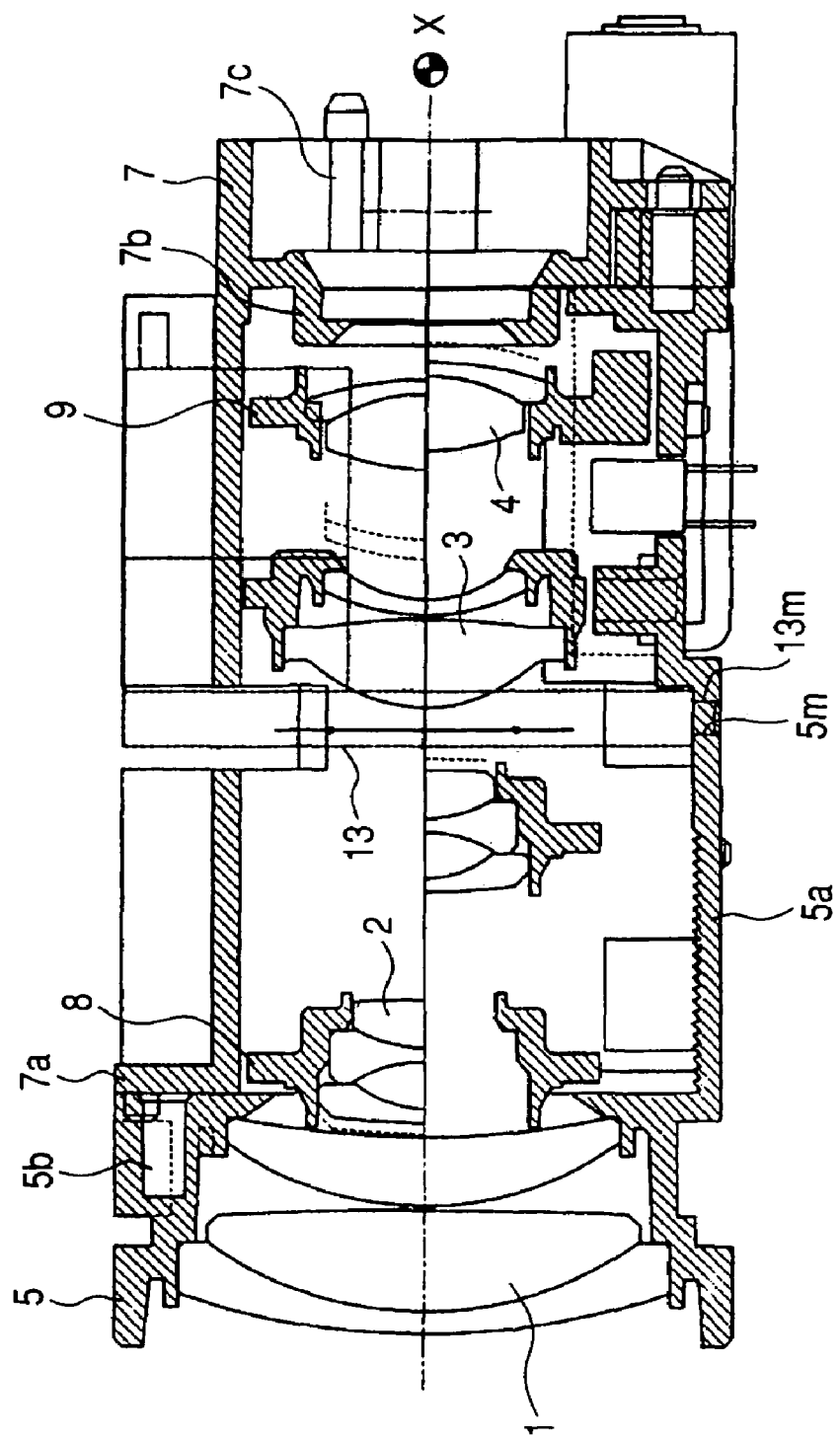
FIG. 1 is a longitudinal sectional view of a zoom lens barrel according to an embodiment of the present invention.
Figure 2:
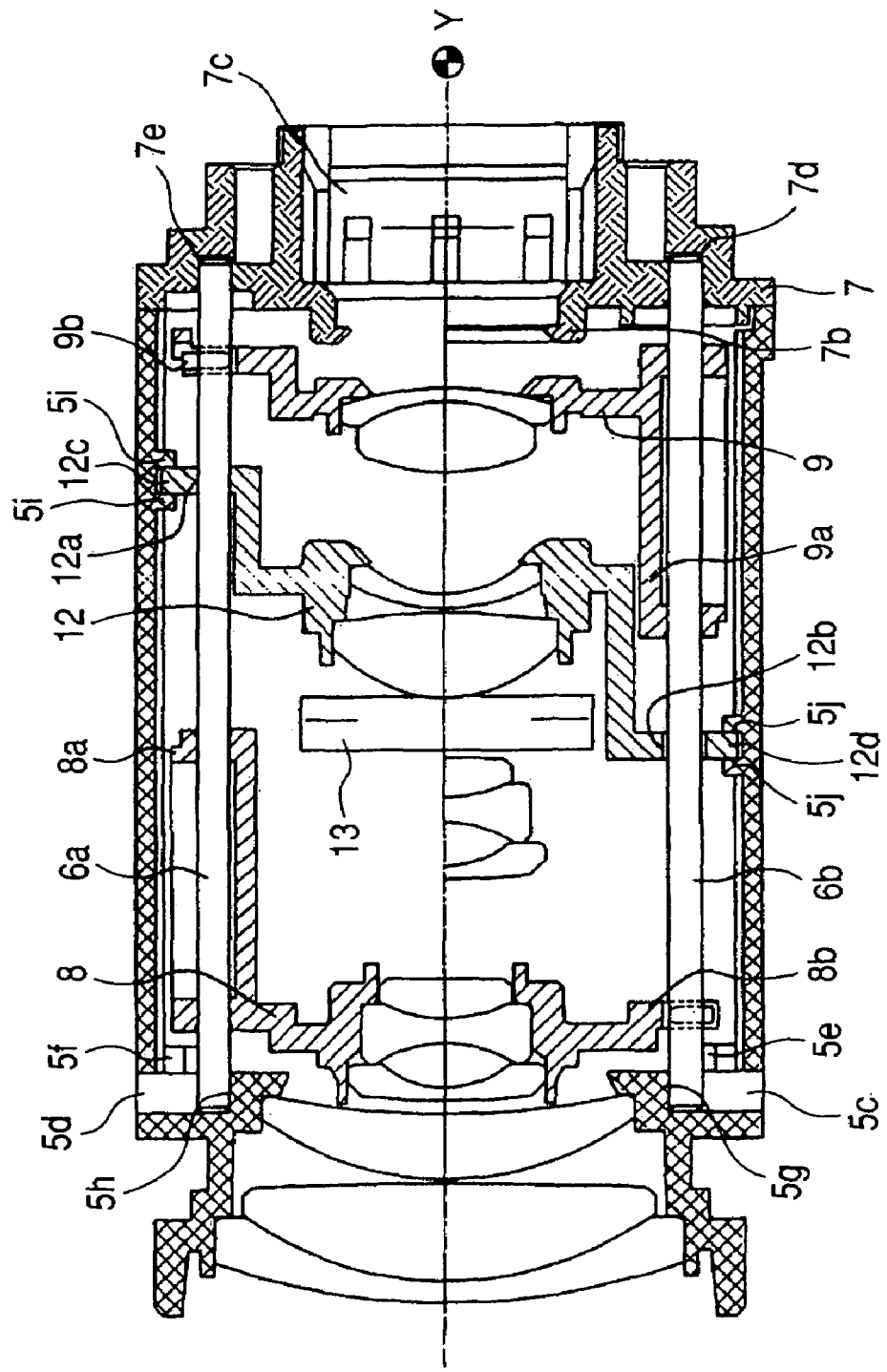
FIG. 2 is a cross-sectional view of the zoom lens barrel.
Figure 3:
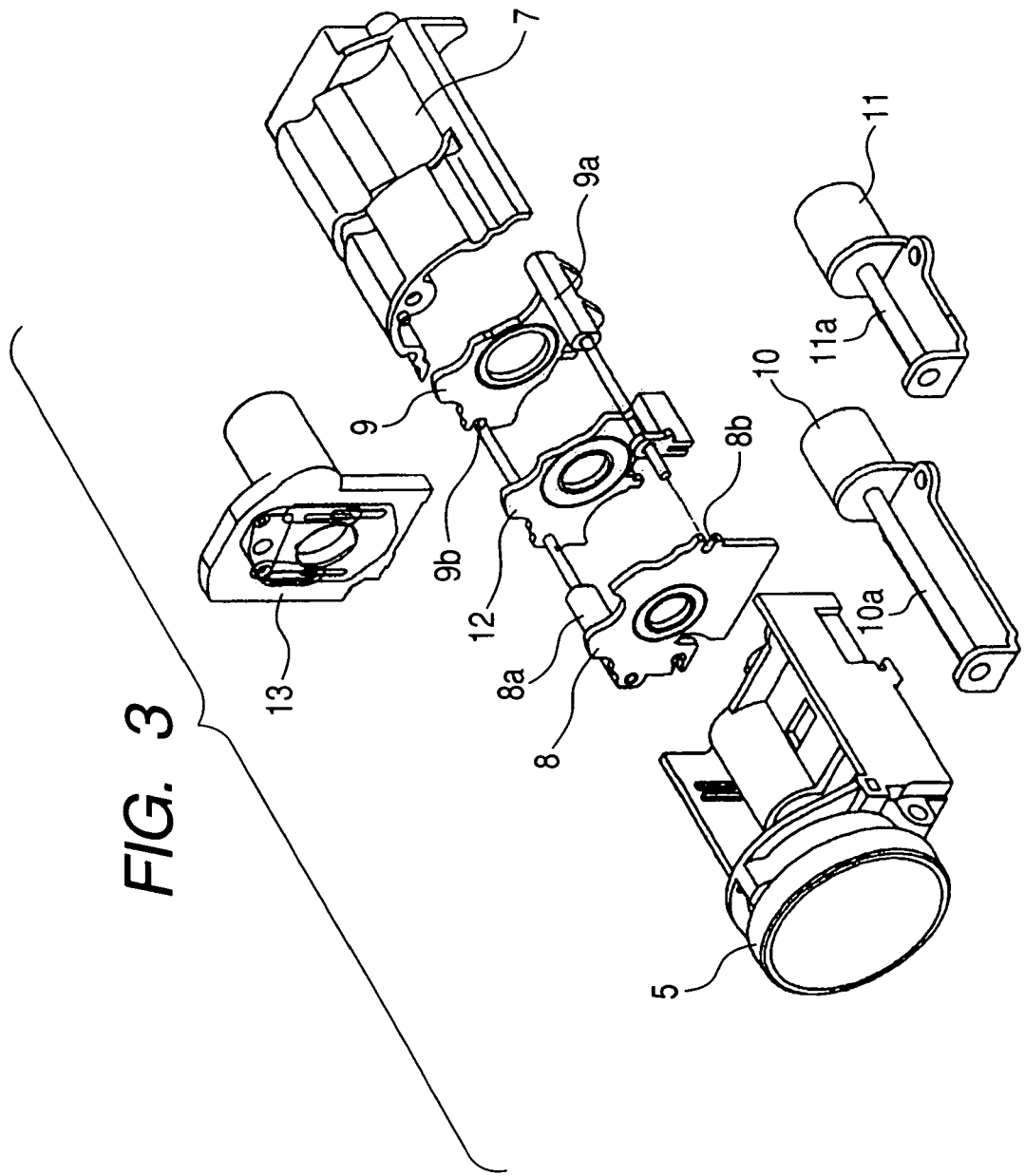
FIG. 3 is an exploded perspective view of the zoom lens barrel.

FIGS. 1 through 3 show the construction of a zoom lens barrel for a video camera (optical apparatus) equipped with a stop device (light amount control device) according to an embodiment of the present invention. First, its construction will be briefly described. Reference numeral 1 indicates a front lens unit (first lens unit), reference numeral 2 indicates a variator lens unit, reference numeral 3 indicates an afocal lens unit, reference numeral 4 indicates a focusing lens unit, reference numeral 5 indicates a front lens barrel, symbols 6a and 6b indicate guide shafts, reference numeral 7 indicates a rear lens barrel, reference numeral 8 indicates a V-movement ring, reference numeral 9 indicates an RR-movement ring, reference numeral 10 indicates a zoom motor, reference numeral 11 indicates a focusing motor, reference numeral 12 indicates an intermediate frame, and reference numeral 13 indicates a stop device. In the following, the embodiment will be specifically described.

In FIGS. 1 and 2, reference numeral 1 indicates the front lens unit constituting a stationary front lens, reference numeral 2 indicates the variator lens unit moving in the optical axis direction to effect scaling, reference numeral 3 indicates the stationary afocal lens unit, and reference numeral 4 indicates the focusing lens unit moving in the optical axis direction to correct image plane movement due to scaling and to effect focus adjustment. In FIG. 3, the lens unit is omitted.

In FIGS. 1 through 3, reference numeral 5 indicates the front lens barrel holding the first lens unit 1. Reference numeral 7 indicates a rear lens barrel having a low-pass filter holding portion 7b and an imaging device holding portion 7c as shown in FIGS. 1 and 2. The low-pass filter holding portion 7b holds an infrared filter and a low-pass filter (not shown), and the imaging device holding portion 7c holds an imaging device 16 (photoelectric conversion element; see FIG. 7) consisting of a CCD, a CMOS sensor, or the like.

Symbols 6a and 6b indicate the guide shafts, which are fitted into reference holes 5g and 5h of the front lens barrel 5 and into reference holes 7d and 7e of the rear lens barrel 7 to be held in position.

The V-movement ring 8 holding the variator lens unit 2 is engaged with the guide shaft 6a so as to be capable of moving in the optical axis direction and has a sleeve portion 8a preventing inclination of the V-movement ring 8 with respect to the optical axis and a U-shaped groove 8b engaged with the guide shaft 6b so as to be capable of moving in the optical axis direction with respect to the guide shaft 6b. Due to the engagement of the U-shaped groove 8b with the guide shaft 6b, rotation of the V-movement ring 8 around the guide shaft 6a is prevented. In this way, by means of the two guide shafts 6a and 6b, the variator lens unit 2 is aligned with the optical axis.

Further, a rack (not shown) is mounted to the V-movement ring 8, and this rack is engaged with a screw shaft 10a of the zoom motor 10 shown in FIG. 3, whereby the V-movement ring 8 is driven in the optical axis direction through rotation of the screw shaft 10a.

Further, the RR-movement ring 9 holding the focusing lens unit 4 is engaged with the guide shaft 6b so as to be capable of moving in the optical axis direction, and has a sleeve portion 9a preventing inclination of the RR-movement ring 9 with respect to the optical axis, and a U-shaped groove 9b engaged with the guide shaft 6a so as to be capable of moving in the optical axis direction. Due to the engagement of the U-shaped groove 9b with the guide shaft 6a, rotation of the RR-movement ring 9 around the guide shaft 6b is prevented. In this way, the focusing lens unit 4 is aligned with the optical axis by means of the two guide shafts 6a and 6b.

Further, a rack (not shown) is mounted to the RR-movement ring 9, and this rack is engaged with a screw shaft 11a of the focusing motor 11 shown in FIG. 3, whereby the RR-movement ring 9 is driven in the optical axis direction through rotation of the screw shaft 11a.

As shown in FIG. 2, like the V-movement ring 8 and the RR-movement ring 9, the intermediate frame 12 holding the afocal lens unit 3 has a reference positioning hole 12a and a rotation preventing elongated hole 12b, which are respectively engaged with the guide shafts 6a and 6b, whereby the afocal lens unit 3 is aligned with the optical axis. Further, at three positions on the intermediate frame 12, there are formed engagement portions 12c, 12d, and one which is not shown engaged with lock portions 5i, 5j, and one which is not shown formed in the front lens barrel 5, whereby inclination of the afocal lens unit 3 is prevented.

Reference numeral 13 indicates the stop device of this embodiment. The stop device 13 is arranged between the V-movement ring 8 and the intermediate frame 12, and, as indicated by the dashed lines in FIG. 1, has a press-fitting portion 13m press-fitted into a holding groove 5m formed in the front lens barrel 5, whereby the stop device 13 is held by the front lens barrel 5.

Figure 7:
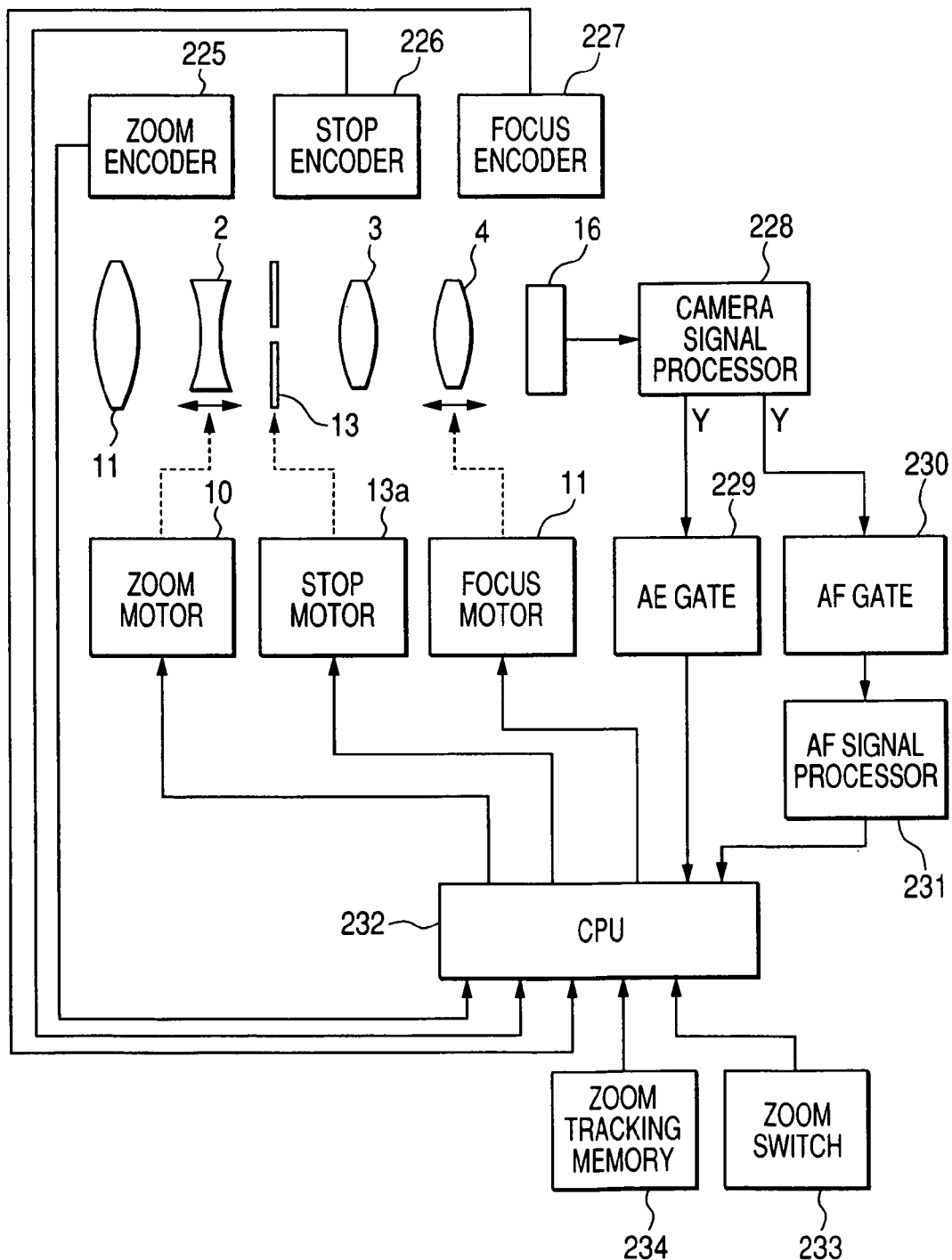
FIG. 7 is a block diagram showing the electric circuit configuration of the zoom lens barrel.
Figure 8:
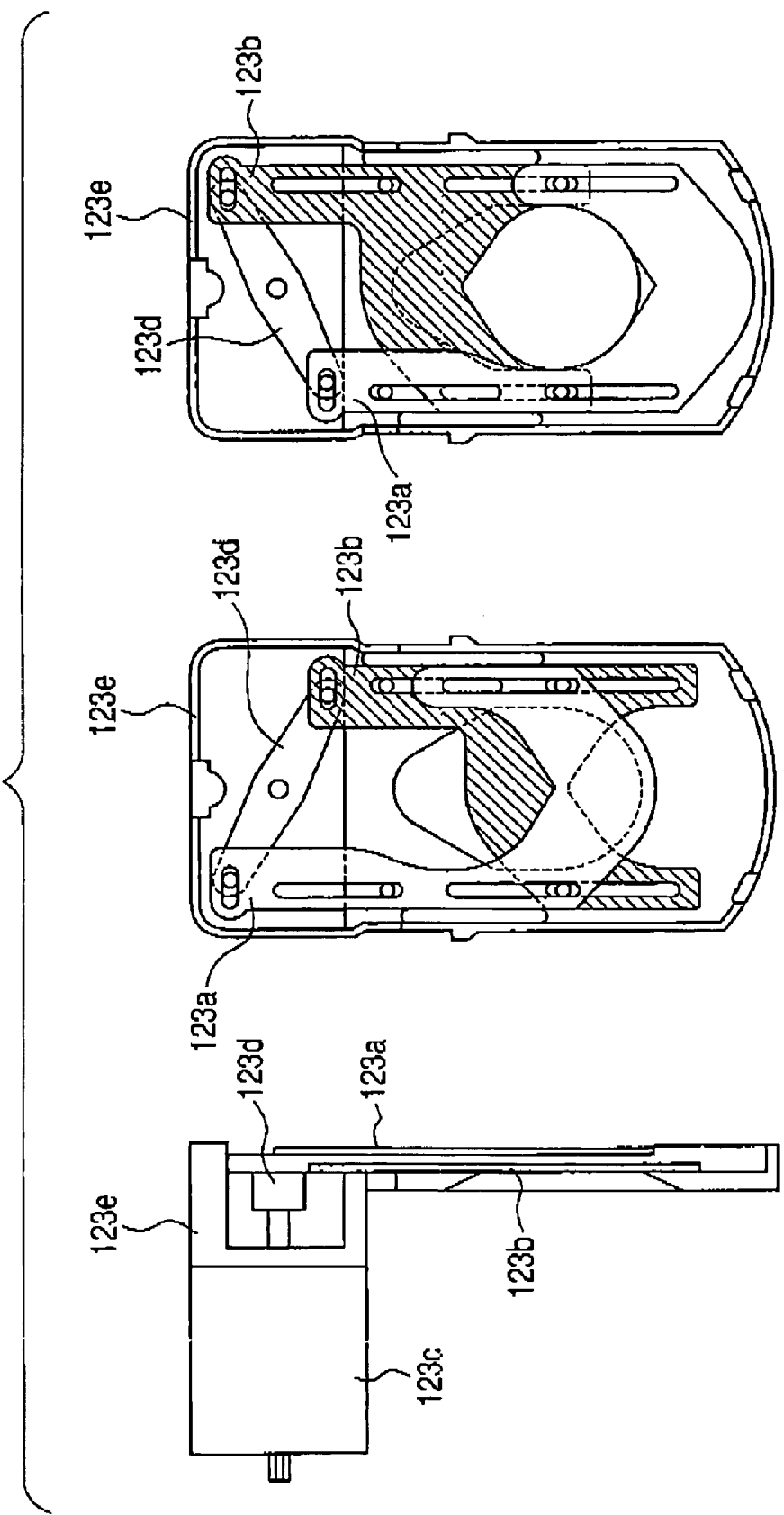
FIG. 8 is a diagram showing the construction of a conventional stop device.
Figure 9:
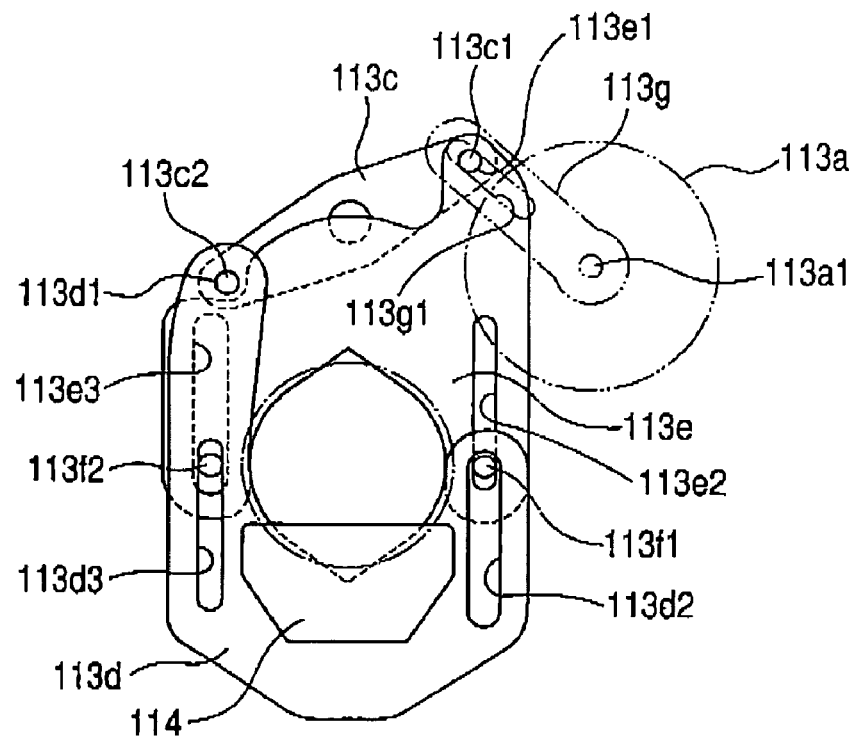
FIG. 9 is a diagram showing the construction of a conventional stop device (in the open state)
Figure 10:
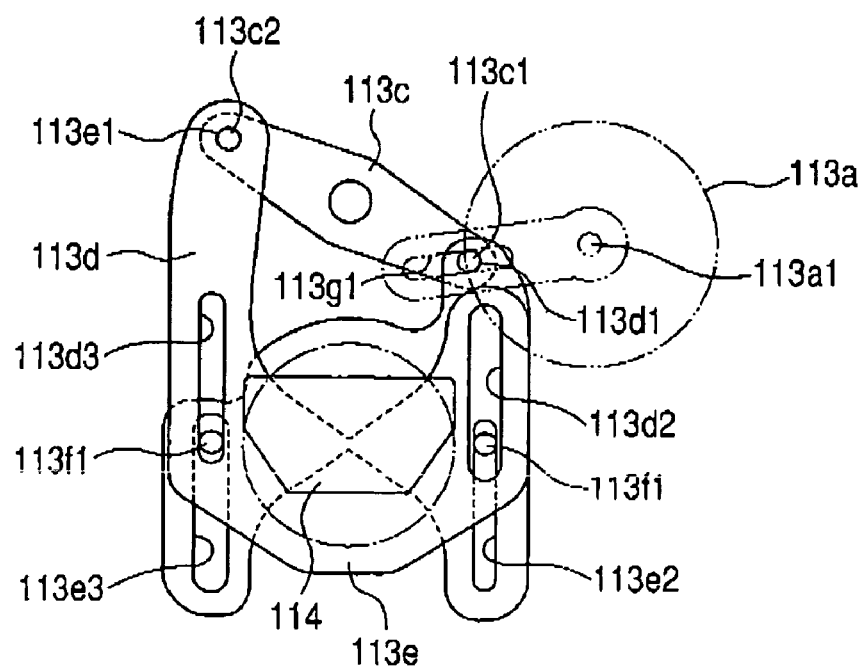
FIG. 10 is a diagram showing the construction of the conventional stop device (in the totally closed state)

Here, the electric circuit configuration of the video camera as a whole including the zoom lens barrel of this embodiment will be briefly described with reference to FIG. 7. In the drawing, the components common to those shown in FIGS. 1 through 4 are indicated by the same symbols, and a description of such components will be omitted.

Reference numeral 16 indicates the imaging device mentioned above. Symbol 13a indicates a stop motor for driving the stop device. Reference numeral 225 indicates a zoom encoder, and reference numeral 227 indicates a focus encoder. These encoders respectively detect the absolute positions in the optical axis direction of the V-movement ring 8 and the RR-movement ring 9 (here, the term "absolute position" means a position in the optical axis with respect to the stop device or the image taking device equipped therewith, such as a video camera, for example, a position with respect to the imaging device). When DC motors are used as the zoom motor 10 and the focusing motor 11, there is used an absolute position encoder such as a volume or a magnetic type one. When stepping motors are used as the zoom motor 10 and the focusing motor 11, it is general practice to first move the movement rings 8 and 9 to reference positions and then count the numbers of drive pulses input to the stepping motors to thereby detect the positions of the movement rings 8 and 9.

Reference numeral 226 indicates a stop encoder, which is, for example, of the type in which a Hall element is arranged inside the stop motor 13a to detect the rotation positional relationship between a rotor and a stator.

Reference numeral 232 indicates a CPU serving as a controller for controlling this video camera. Reference numeral 228 indicates a camera signal processor for effecting predetermined amplification, gamma correction, etc. on the output from the imaging device 16. A contrast signal of a video signal that has undergone such predetermined processing passes an automatic exposure (AE) gate 229 and an automatic focus (AF) gate 230. That is, an optimum signal extraction range for exposure determination and focusing is set at this gate of the entire screen.

Reference numeral 231 indicates an AF signal processor for processing an AF signal for automatic focusing (AF), which generates one or a plurality of outputs related to a high-frequency component of a video signal. Reference numeral 233 indicates a zoom switch, and reference numeral 234 indicates a zoom tracking memory. The zoom tracking memory 234 stores information (zoom tracking data) on a focusing lens position to be set according to the object distance and the variator lens position at the time of scaling. It is also possible to use a memory inside the CPU 232 as the zoom tracking memory.

When the zoom switch 233 is operated by the photographer, the CPU 232 controls the driving of the zoom motor 10 and the focusing motor 11 such that coincidence is effected between the current absolute position in the optical axis direction of the variator lens unit 2 constituting the detection result of the zoom encoder 225 and the calculated position to which the variator lens unit 2 is to be set, and between the current absolute position in the optical axis direction of the focus lens unit 4 constituting the detection result of the focus encoder 227 and the calculated position to which the focus lens unit 4 is to be set, in order that a predetermined relationship may be maintained between the variator lens unit 2 and the focusing lens unit 4 as calculated based on the information of the zoom tracking memory 234.

In the auto focus operation, the CPU 232 drive-controls the focusing motor 11 such that the output of the AF signal processor 23 indicates a peak.

Further, to attain appropriate exposure, the CPU 232 controls the driving of the stop motor 13a such that the output of the stop encoder 226 attains a predetermined value, which is the average value of the Y signal outputs having passed the AE gate 229, thereby controlling the aperture diameter.

Next, the construction of the stop device will be described with reference to FIGS. 4A through 4C. FIG. 4A shows the state in which the aperture is open, and FIG. 4B shows the state in which the aperture is totally closed. FIG. 4C is a top view of the stop device.

Symbol 13a indicates a stop motor serving as an actuator. The actuator may be of any type as long as it generates a torque of a fixed level or more for opening and closing the aperture; for example, it is possible to use a galvanometer or a stepping motor.

The stop motor 13a is held by a base member (not shown). The base member has a stationary opening A indicated by alternate long and short dashed lines in the drawing.

The distal end portion of a first lever 13b is press-fitted into an output shaft 13a1 of the stop motor 13a. Further, a second lever (lever member) 13c is supported by the base member so as to be rotatable around a shaft portion 13c3 provided at the intermediate portion thereof.

At the ends of the second lever 13c, there are provided pin portions (connecting portions) 13c1 and 13c2. The pin portion 13c2 is rotatably engaged with a round hole 13d1 formed in a first aperture blade (shading member) 13d.

Further, on both sides with respect to the width direction of the first aperture blade 13d, there are formed vertically extending elongated holes 13d2 and 13d3. Engaged with the elongated holes 13d2 and 13d3 are guide pins 13f1 and 13f2 provided on the base member. On the inner side of the first aperture blade 13d, there is formed an aperture forming portion 13d4 forming an aperture serving as a light transmitting hole (that is, forming the lower half of the aperture in the open state), and the first aperture blade 13d as a whole is formed substantially in a U-shaped configuration.

The pin portion 13c1 of the second lever 13c is rotatably engaged with a round hole 13e1 formed in a second aperture blade 13e. Further, on both sides with respect to the width direction (the horizontal direction in the drawing) of the second aperture blades 13e, there are formed vertically extending elongated holes 13e2 and 13e3. The elongated holes 13e2 and 13e3 are engaged with the guide pins 13f1 and 13f2 provided in the base member. On the inner side of the second aperture blade 13e, there is formed an aperture forming portion 13e4 forming an aperture serving as a light transmitting hole (that is, forming the upper half of the aperture in the open state), and the second aperture blade 13e as a whole is formed substantially in a U-shaped configuration. A guard portion to be described below is formed on the second aperture blade 13e.

The first and second aperture blades 13d and 13e are mounted to the second lever 13c in the following order: the second aperture blade 13e and the first aperture blade 13d from the second lever 13c side.

In the stop device thus constructed, when the actuator 13a rotates, the second lever 13c rotates through the first lever 13g, with the result that the aperture blades 13d and 13e are driven vertically as seen in the drawing.

While the elongated holes 13d2, 13d3, 13e2, and 13e3 may extend linearly in the vertical direction, they may also extend so as to draw gentle arcs so that the first and second aperture blades 13d and 13e may move without inclining with respect to the vertical direction upon the rotation of the second lever 13c.

Further, as shown in FIG. 4A, attached by adhesion to the surface of the first aperture blade 13d on the side opposite to the second aperture blade 13e is an ND filter 14 configured so as to cover the entire aperture in the open state (which means the entire area corresponding to the stationary opening A).

The configuration of the ND filter 14 is such that the lower two corner portions of a rectangular plate are obliquely cut away, and that the maximum width Wmax in the horizontal direction thereof is set smaller than the minimum horizontal interval Imin between the inner sides of the pin portions (connecting portions) 13c1 and 13c2 in the rotation range of the second lever 13c. Further, the ND filter 14 extends upwards from the aperture forming portion 13d4 (in the direction of the second lever 13c), and in the totally closed state as shown in FIG. 4B, the upper portion thereof (in particular, the right-hand side portion thereof) overlaps the second lever 13c in the optical axis direction (the direction perpendicular to the plane of the drawing).

More specifically, in the totally closed state, the upper end of the ND filter 14 reaches a position where it is upwardly further spaced apart from the optical axis L (in the direction perpendicular to the optical axis) than the pin portion 13c1 of the second lever 13c, the pin portion 13c1 coming nearer to the optical axis L than the other pin portions of the second lever 13c. The upper right-hand side portion of the ND filter 14 is neither attached to nor supported by the first aperture blade 13d, and is situated substantially in a plane perpendicular to the optical axis due to the rigidity of the ND filter 14.

Accordingly, when, for example, warpage is generated in the ND filter 14 or when vibration is applied to the video camera, there is the possibility of the upper right-hand side portion of the ND filter 14 interfering with the second lever 13c. In particular, in the stop device of this embodiment, by setting the maximum width of the ND filter 14 smaller than the minimum interval between the pin portions 13c1 and 13c2, the upper portion of the ND filter 14 is allowed to move to a position where it enters the space between the pin portions 13c1 and 13c2 (where it overlaps the second lever 13c in the optical axis direction), whereby a reduction in the vertical size of this stop device, using the large ND filter 14, is achieved. Further, the first aperture blade 13d, to which the ND filter 14 is attached, the second aperture blade 13e, and the second lever 13c are held as close as possible to each other in the optical axis direction, thereby achieving a reduction in the thickness in the optical axis direction of the stop device. As a result, the interference as mentioned above is likely to occur, which increases the possibility of smooth stopping operation being hindered.

Figure 6:
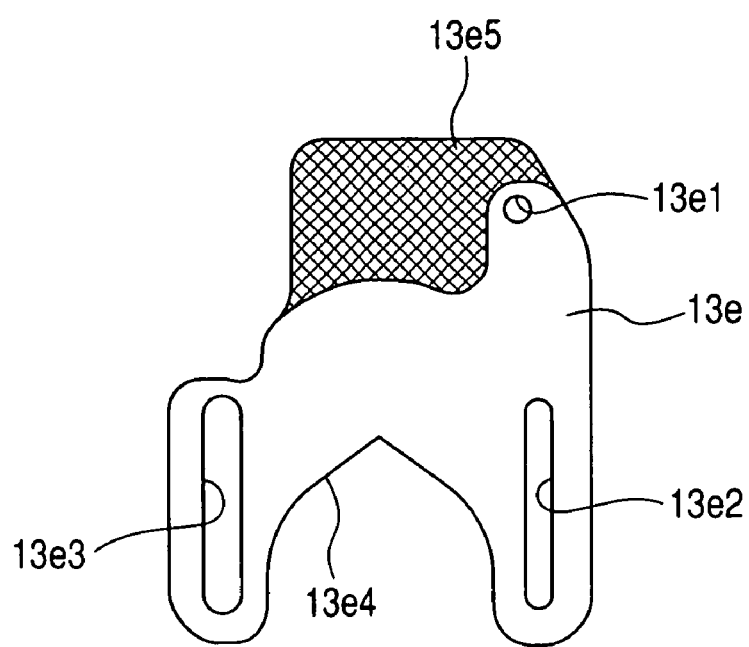
FIG. 6 is a diagram showing a second aperture blade used in the stop device.

Thus, as shown in FIG. 6, in this embodiment, there is formed in the upper portion of the second aperture blade 13e a guard portion 13e5 which extends upwards and widthwise from the contour of the conventional second aperture blade indicated by the alternate long and short dashed lines in the drawing.

As shown in FIG. 4B, as the aperture is changed from the half-closed state to the totally closed state, the guard portion 13e5 enters the space between the ND filter 14 and the second lever 13c. In the totally closed state, the guard portion 13e5 extends to a position where it is upwardly further spaced apart from the optical axis L than the pin portion 13c1 and the upper end of the ND filter 14.

Thus, if the upper portion of the ND filter 14 (in particular, the upper right-hand side portion thereof) is warped or vibrated toward the second lever 13c, the ND filter 14 is prevented from coming into contact with the second lever 13c due to the presence of the guard portion 13e5. Thus, even if the ND filter 14 is formed so large as to cover the entire aperture in the open state, it is possible to guarantee smooth stopping operation without involving interference between the ND filter 14 and the second lever 13c.

Figure 5:
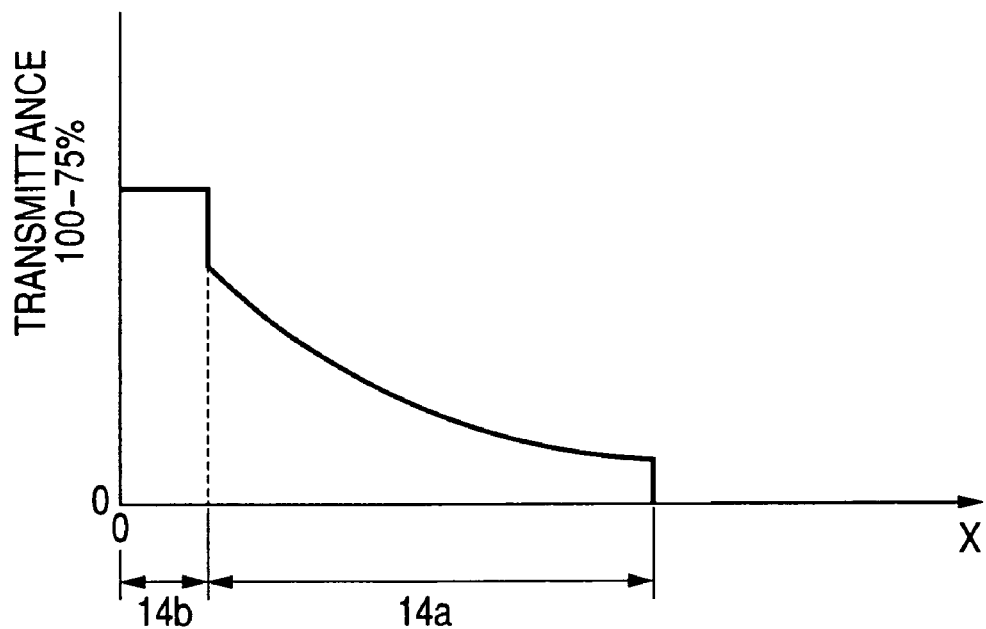
FIG. 5 is a diagram showing the transmittance of an ND filter used in the stop device.
Figure 11:
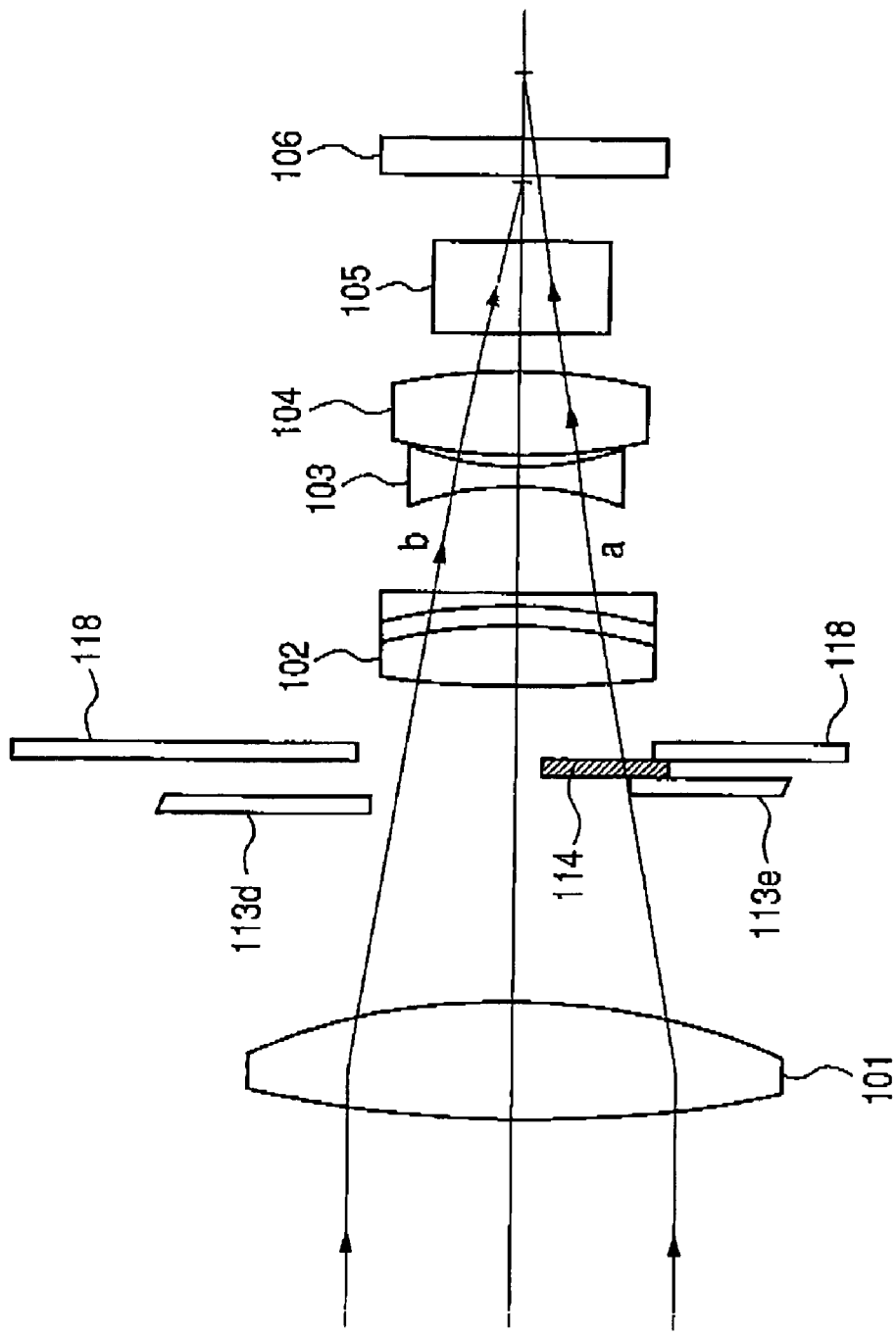
FIG. 11 is a sectional view of an optical system including a conventional stop device.
Figure 12:
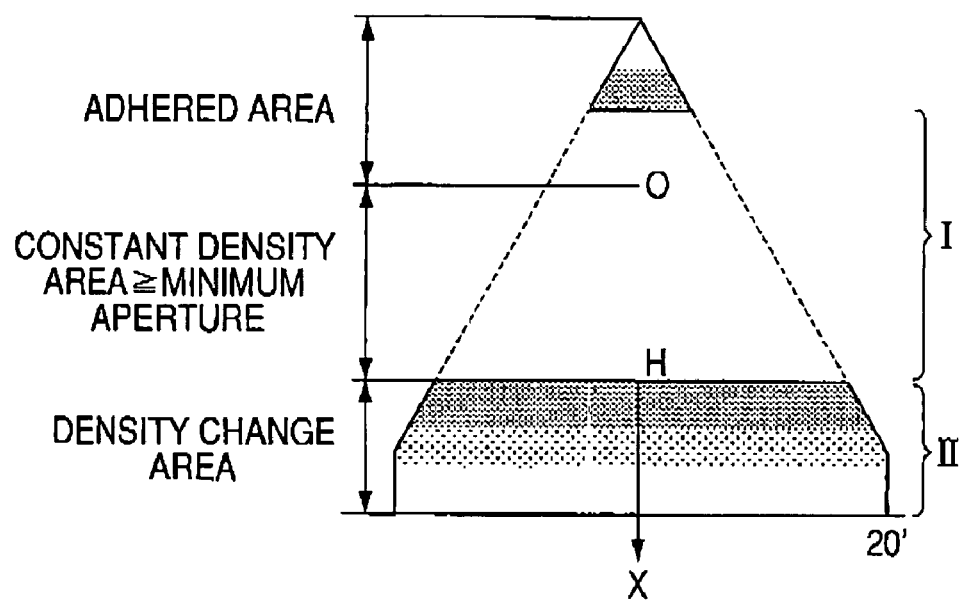
FIG. 12 is a diagram showing the transmittance of an ND filter used in a conventional stop device.
Figure 13:
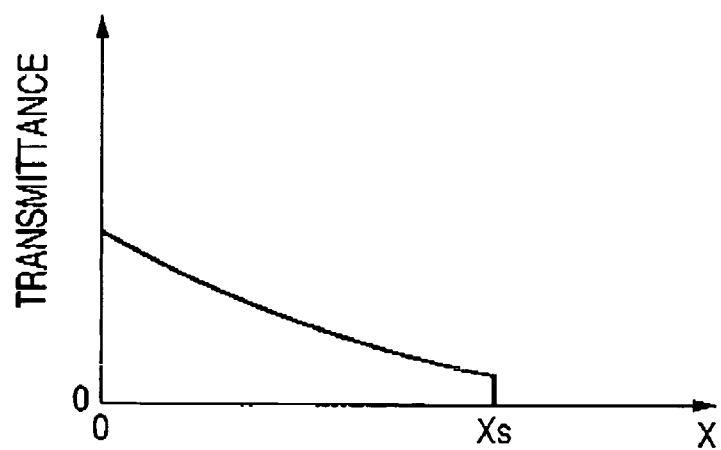
FIG. 13 is a diagram showing the transmittance of an ND filter used in a conventional stop device.
Figure 14:
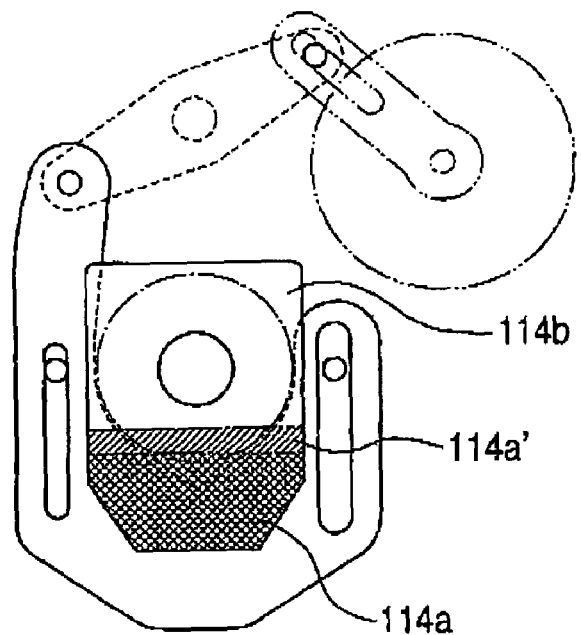
FIG. 14 is a diagram showing the construction of a conventional stop device.
Figure 15:
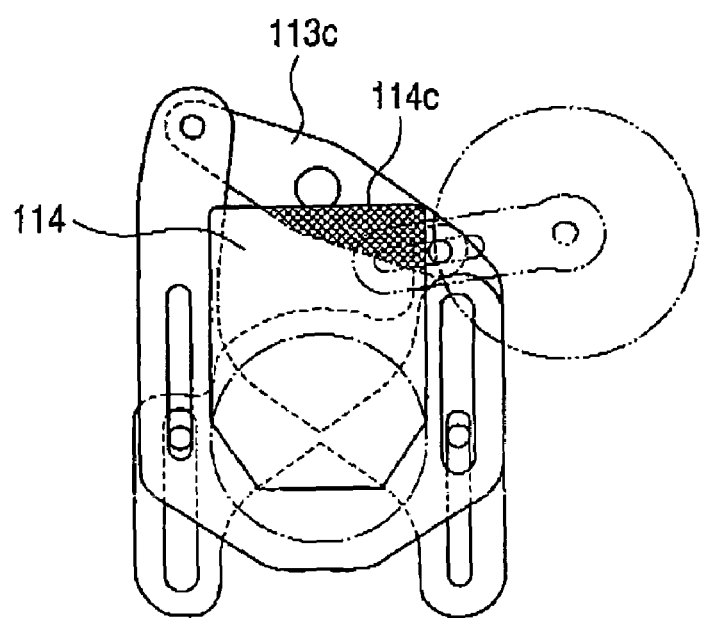
FIG. 15 is a diagram showing the construction of a conventional stop device (in the totally closed state).

As shown in FIG. 5, the ND filter 14 consists of a light attenuation portion 14a intended for attenuation of light amount and having a transmittance lower than 75% (In the example of FIG. 5, the transmittance changes gradually), and a non-attenuation portion 14b situated nearer to the open side (the upper side in FIG. 4A) than the light attenuation portion 14a and having a transmittance of 75% or more, which practically means no light attenuating action for the imaging device. The light attenuation portion 14a and the non-attenuation portion 14b are formed on a base member of the same material and the same thickness. The light attenuation portion 14a has an area large enough to cover up the small-aperture side aperture of a predetermined size, whereby there is obtained the effect of restraining so-called small-aperture diffraction. Further, by making the non-attenuation portion 14b large enough to enable the ND filter 14 to cover the entire aperture in the open state, it is possible to prevent a deviation in image forming position (see FIG. 11) generated between the portion of the light passing the aperture which has passed through the filter and the portion thereof which has not passed through the filter.

While the above-described embodiment employs an ND filter 14 whose light attenuation portion 14a undergoes changes in density, it is also possible to use an ND filter whose light attenuation portion 14a is of constant density.

As described above, according to the present invention, there is used an ND filter large enough to cover the entire aperture in the open state, whereby it is possible to realize a stop device capable of smooth stopping operation from the open state to the totally closed state while preventing a deterioration in image quality due to a deviation in image forming position in contrast to the case in which there is used an ND filter covering only a part of the aperture in the open state as in the prior art.

While the above-described embodiment is applied to a zoom lens barrel for a video camera, the present invention is also applicable to a light amount control device to be mounted on various optical apparatuses, such as an electronic still camera or an interchangeable photographic lens. Further, it is also applicable to observation optical systems (e.g., a telescope, binocular, microscope, or a head-mount display like a spectacle-type display).

Further, it is also possible to form the ND filter such that there is provided, on the open side of the light attenuation portion having the first transmittance, a non-attenuation portion formed of the same material and in the same thickness and having substantially no light attenuating function, in which the width of the non-attenuation portion is large enough to cover up the aperture configuration when, immediately before the light attenuation portion covers up a desired F number (small-aperture side aperture), the area of the aperture covered solely with the non-attenuation portion is substantially equivalent to an F number (aperture of F16, etc.) involving generation of small-aperture diffraction.

In this embodiment as described above, in the entire area of the area variable range of the light passage opening (aperture) due to the ND filter, it is possible to eliminate a deviation in image forming position of the light passing through the light passage opening, and to prevent interference (contact) of the ND filter with the lever member, thereby guaranteeing smooth operation.

In particular, in the case in which first and second connecting portions connected to first and second shading members are provided at the ends of a lever member, a construction is adopted in which, with the light passage opening being closed, the ND filter overlaps in the optical axis direction the inner-side portion between the first and second connecting portions of the lever member, whereby it is possible for the ND filter, which is large, to move while avoiding the connecting portions, thereby preventing an increase in the size of the device. Generally speaking, in a light amount control device, the first and second shading members and the lever member are arranged so as to be close to each other in the optical axis direction, thereby achieving a reduction in the thickness of the device. In this case, providing the above-mentioned guard portion is very effective in preventing interference between the ND filter and the lever member arranged so as to be close to each other.

Further, in the case in which, in the closed state, the forward end of the ND filter with respect to the closing direction reaches a position further spaced apart from the optical axis in a direction perpendicular to the optical axis than the connecting portion of the lever member and the second shading member, extending the guard portion to a position further spaced apart from the optical axis in the direction perpendicular to the optical axis than the above-mentioned connecting portion makes it possible to more reliably prevent interference between the ND filter and the lever member.

This application claims priority from Japanese Patent Application No. 2004-020550 filed on Jan. 28, 2004, which is hereby incorporated by reference herein.

What is claimed is:

1. A light amount control device comprising:
a first shading member and a second shading member which are adapted to move within a plane perpendicular to an optical axis to vary an area of a light passage opening;
a lever member which is connected with the first shading member and the second shading member and which is rotatable;
an actuator for driving the lever member; and
an ND filter mounted to the first shading member,
wherein the ND filter is configured to cover an entirety of the light passage opening in an open state, and wherein the second shading member has a guard portion which, with the light passage opening being in a closed state, is arranged between the lever member and the ND filter, preventing the ND filter from coming into contact with the lever member.

2. A light amount control device according to claim 1, wherein the lever member has at both ends thereof a first connecting portion and a second connecting portion for connection with the first shading member and the second shading member, and
wherein, in the closed state, the ND filter overlaps an inner-side portion between the first connecting portion and the second connecting portion of the lever member in the optical axis direction, with the guard portion being therebetween.

3. A light amount control device according to claim 1, wherein, in the closed state, a forward end of the ND filter with respect to a closing direction reaches a position further spaced apart from the optical axis in a direction perpendicular to the optical axis than a connecting portion where the lever member and the second shading member are connected with each other, and
wherein the guard portion extends to a position further spaced apart from the optical axis in the direction perpendicular to the optical axis than the connecting portion.

4. An optical apparatus comprising the light amount control device as claimed in claim 1.

5. An optical apparatus according to claim 4, further comprising an optical system for effecting image formation with light passed through the light passage opening.

6. An optical apparatus according to claim 4, further comprising an optical system capable of showing an observer a virtual image by using light passed through the light passage opening.

* * * * *